M. J. CANTOR & E. SIEGEL.
TIRE FOR VEHICLES.
APPLICATION FILED APR. 7, 1911.
1,004,626.
Patented Oct. 3, 1911.
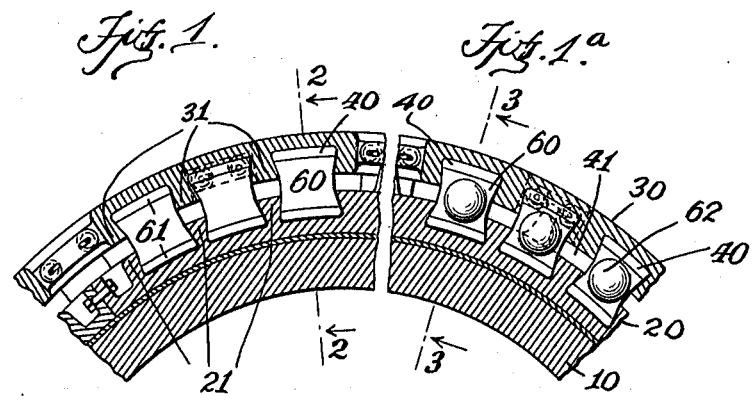
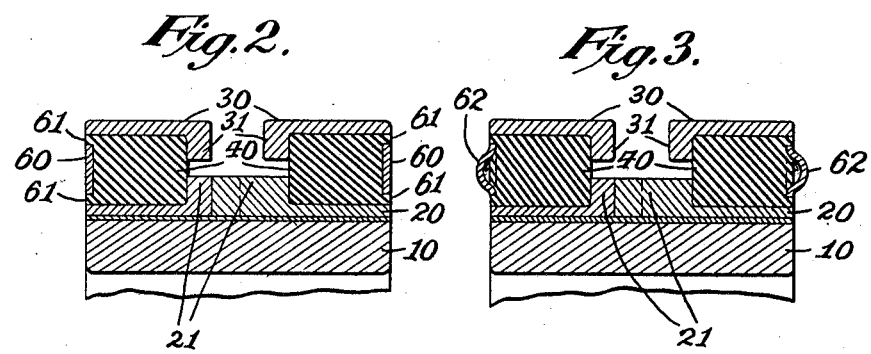
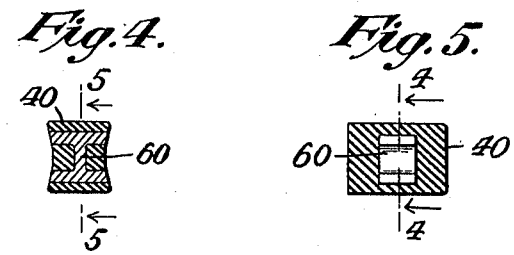
Attest:
Stephen B. Newton
Alan C. McDonnell
Ernest Siegel and
Michael J. Cantor
Inventors
by William R. Baird
their Atty

UNITED STATES PATENT OFFICE.

MICHAEL J. CANTOR AND ERNEST SIEGEL, OF NEW YORK, N. Y.

TIRE FOR VEHICLES.

1,004,626.  Specification of Letters Patent.  Patented Oct. 3, 1911.

Application filed April 7, 1911. Serial No. 619,497.

*To all whom it may concern:*

Be it known that we, MICHAEL J. CANTOR and ERNEST SIEGEL, citizens of the United States, residing at New York, in the county of New York and State of New York, have invented certain new and useful Improvements in Tires for Vehicles, of which the following is a specification.

This invention relates to tires for vehicles and especially to self propelled vehicles adapted to carry heavy loads.

In an application for Letters Patent of the United States Serial No. 584,433 filed by us on the 29th day of September 1910, we described a vehicle tire comprising a felly made in sections, a concentric treading rim also made in sections and intermediate resilient members adapted to take up and transmit the usual shocks and vibrations which occur in use. In the form of tire referred to which we prefer, the felly and the treading rim are provided with reentrant dove-tailed recesses registering with each other and into each pair of which an intermediate resilient member preferably made of rubber is adapted to fit. Under somewhat difficult but not unusual conditions of traction the treading sections of the tire may pull away from the intermediate resilient members which are held in place by their own inherent elasticity and the tire thus becomes disorganized.

The purpose of this invention is to provide means to prevent such accidental displacement or disengagement and while retaining the feature of practical elasticity of the resilient members to limit its use within practical limits.
In the drawings Figure 1 is a section through a portion of a tire embodying the invention and a side elevation of the resilient members. Fig. 1ª is a similar section and elevation of a slightly modified form.
Fig. 2 is a transverse section on the plane of the line 2—2 in Fig. 1 and Fig. 3 is a transverse section on the plane of the line 3—3 in Fig. 1ª. Fig. 4 is a section through a resilient member provided with a modified form of the retaining means on the plane of the line 4—4 in Fig. 5 and Fig. 5 is a section through the same on the plane of the line 5—5 in Fig. 4.

In the drawings 10 is the felly of a wheel made of any suitable size and material and adapted to receive spokes or to be otherwise arranged to support the framework of the vehicle. Encircling this felly is an inner rim 20 preferably made in sections and provided with radially outwardly projecting flanges 21 arranged symmetrically in series around the tire, each flange having undercut sides to form side walls of dovetailed recesses on each side of the flanges adapted to receive one end of a resilient member 40 hereinafter described. The sections of the inner rim are secured together around the felly in any suitable manner. Arranged concentrically around this inner rim is an outer treading rim 30 preferably made in sections and provided with radially inwardly projecting flanges 31 arranged symmetrically in series around the tire, each flange having undercut sides to form side walls of dove-tailed recesses on each side of the flange adapted to receive one end of a resilient member 40. The sections of this outer treading rim are secured together in any suitable manner to permit of some slight flexibility of movement.

In the preferred form shown the dovetailed recesses of the inner rim register with those of the outer rim, and between each such pair is inserted a resilient member 40 made in the form of a double wedge with its bases turned in opposite directions, one wedge partially but not wholly filling one of the dove-tailed recesses so that a space 41 is left between the inner rim 20 and outer rim 30.

In use the sections of the outer rim and those of the inner rim approach each other when the vehicle is loaded and the resilient members or cushions 40 are then compressed, but these cushions are so made that it is intended that the rims shall not touch each other under usual conditions of traction service. It is desirable therefore that the movement of the outer rim 20 toward the inner rim 10 should be limited in both directions inwardly to prevent contact of the rims and under compression of the resilient members 40, and outwardly to prevent the sections of the outer rim from tearing away from the resilient members. To that end we have provided retainers 60 which in one form comprise double dove-tailed pieces of steel or other suitable material which fit into the registering recesses of the inner and outer rims, but are radially shorter than the resilient members 40 alongside of which they are placed, leaving a space 61 on each side to allow for the usual compression of such resilient members. Under excessive compression the edges of these retainers will contact with the surface of the inner and outer rims and prevent the further inward movement of the outer rim. If the outer rim is pulled away from the inner rim, the sloping edges of the retainers engage the corresponding edges of the recesses of the rims in which they are placed and limit the outward movement of the outer rim correspondingly. The retainers may be loosely set alongside of the resilient members or they may be secured thereto. In Figs. 4 and 5 they are shown as centrally embedded within the resilient members. In Fig. 3 and at the right in Fig. 1 they are shown provided with a hollow projecting boss 62 to permit of the later expansion of the resilient members therein when compressed.

This device is readily and cheaply made, quickly put into place, simple in form, not likely to get out of order and efficient in practice.

What we claim is:

1. A vehicle wheel comprising a felly provided with dove-tailed recesses, an outer concentric rim also provided with dove-tailed recesses registering with those of the felly, double dove-tailed resilient members each adapted to fit into an opposed pair of such recesses and retaining members each also adapted to fit in the same pair of recesses to limit the relative movement of the felly and outer rim.

2. In a vehicle wheel comprising a felly and a rim having reëntrant recesses, and an outer rim having reëntrant recesses registering with those of the inner rim, and intermediate resilient members, each adapted to fit snugly within an opposed pair of such recesses; a retaining member for each resilient member consisting of a rigid plate adapted to fit the same pair of recesses but radially shorter than its resilient member.

3. In a vehicle wheel comprising an inner rim and an outer rim each provided with registering dove-tailed recesses, and intermediate double dove-tailed resilient members one fitting into each opposed pair of recesses, non-resilient members, one for each resilient member, fitting into the same pair of recesses.

4. In a vehicle wheel comprising an inner rim and an outer rim each provided with registering dove-tailed recesses, and intermediate double dove-tailed resilient members one fitting into each opposed pair of recesses, retainers adapted to prevent the displacement of the resilient members from their respective recesses, consisting of double dove-tailed plates adapted to engage the sides of the recesses.

5. In a vehicle wheel comprising an inner rim and an outer rim each provided with registering dove-tailed recesses, and intermediate double dove-tailed resilient members one fitting into each opposed pair of recesses, retainers adapted to prevent the displacement of the resilient members from their respective recesses, consisting of double dove-tailed plates adapted to engage the sides of the recesses, but radially shorter than the resilient members.

6. In a vehicle wheel comprising an inner rim and an outer rim each provided with registering dove-tailed recesses, and intermediate double dove-tailed resilient members one fitting into each opposed pair of recesses, retainers adapted to prevent the displacement of the resilient members from their respective recesses, consisting of non-resilient plates adapted to engage the sides but not the ends of the dove-tailed recesses.

7. A vehicle wheel comprising a felly provided with dove-tailed recesses, an outer concentric rim also provided with dove-tailed recesses registering with those of the felly, double dove-tailed resilient members each adapted to fit into an opposed pair of such recesses and a retaining member also adapted to fit in the same pair of recesses to limit the relative movement of the felly and outer rim, and which retaining members are hollowed out to permit of the expansion of the resilient members.

In testimony whereof we have affixed our signatures in presence of two witnesses.

MICHAEL J. CANTOR.
ERNEST SIEGEL.

Witnesses:
 E. W. SCHERR, Jr.,
 ALAN C. McDONNELL.

---

Copies of this patent may be obtained for five cents each, by addressing the "Commissioner of Patents, Washington, D. C."